(12) United States Patent
Carballal Camacho

(10) Patent No.: US 11,445,652 B2
(45) Date of Patent: Sep. 20, 2022

(54) DEVICE FOR COMBING AND CONDITIONING ARTIFICIAL TURF

(71) Applicant: Comercial Carma, S.A., Madrid (ES)

(72) Inventor: Lisardo Carballal Camacho, Madrid (ES)

(73) Assignee: Comercial Carma, S.A., Madrid (ES)

( * ) Notice: Subject to any disclaimer, the term of this patent is extended or adjusted under 35 U.S.C. 154(b) by 143 days.

(21) Appl. No.: 16/487,186

(22) PCT Filed: Nov. 17, 2017

(86) PCT No.: PCT/ES2017/000144
§ 371 (c)(1),
(2) Date: Aug. 20, 2019

(87) PCT Pub. No.: WO2018/154147
PCT Pub. Date: Aug. 30, 2018

(65) Prior Publication Data
US 2021/0120724 A1   Apr. 29, 2021

(30) Foreign Application Priority Data
Feb. 23, 2017  (ES) .............................. ES201700108U

(51) Int. Cl.
*A01B 45/00*    (2006.01)
*A01G 20/35*    (2018.01)
(Continued)

(52) U.S. Cl.
CPC .............. *A01B 45/00* (2013.01); *A01G 20/35* (2018.02); *A46B 13/006* (2013.01); *A46B 13/02* (2013.01); *A46B 2200/30* (2013.01)

(58) Field of Classification Search
CPC ..... A46B 13/02; A46B 13/001; A46B 13/006; A01B 45/00; A01G 20/35; A01G 20/43; E01H 1/045; E01H 1/056; E01H 5/098
(Continued)

(56) References Cited

U.S. PATENT DOCUMENTS 1,209,722 A * 12/1916 James .................. A47L 9/0416
                                                         15/387
2,753,583 A *  7/1956 Jepson ................. A01K 13/002
                                                         15/246
(Continued)

FOREIGN PATENT DOCUMENTS

CA       2955813      1/2016
CN     102612876      8/2012
(Continued)

OTHER PUBLICATIONS

International Search Report in corresponding PCT Application No. PCT/ES2017/000144, dated Apr. 3, 2018 (Engish translation attached).
(Continued)

*Primary Examiner* — Randall E Chin
(74) *Attorney, Agent, or Firm* — Hovey Williams LLP

(57) ABSTRACT

The invention relates to a device for combing and conditioning artificial turf, which comprises a handle (1), a pole (2), a head (3) which houses an electric motor (4), and a pair of brushes (5) driven by the electric motor (4), the brushes (5) being configured for combing and conditioning the artificial turf, and such that the brushes (5) have a helical shape. The device comprises a transmission that comprises a motor output shaft (9) that is associated with a transmission belt (10), which transmits the rotation to a toothed wheel (11), the wheel (11) transmits the rotation to a transmission shaft (12) which ends in a worm screw (13) that transmits the rotation to a transverse shaft (14) via a toothed
(Continued)

wheel (15) attached to the transverse shaft (14) that houses the pair of brushes (5).

3 Claims, 2 Drawing Sheets

(51) Int. Cl.
*A46B 13/00* (2006.01)
*A46B 13/02* (2006.01)

(58) Field of Classification Search
USPC .......................................................... 15/182
See application file for complete search history.

(56) References Cited

U.S. PATENT DOCUMENTS

| | | | |
|---|---|---|---|
| 4,467,591 A | 8/1984 | Dynie | |
| 5,269,082 A | 12/1993 | Sund et al. | |
| 5,493,851 A | 2/1996 | Katzer et al. | |
| 5,603,173 A | 2/1997 | Brazell | |
| 6,041,463 A * | 3/2000 | Stauch | A46B 13/02 15/182 |
| 6,076,265 A | 6/2000 | Huang Lo | |
| 6,382,325 B1 * | 5/2002 | Bovi | A01B 1/065 172/41 |
| 8,161,720 B1 * | 4/2012 | Humphrey | A01D 42/00 56/249 |
| 9,043,961 B2 * | 6/2015 | Gil | A01G 20/43 |
| 2005/0252184 A1 * | 11/2005 | Craig | A01D 42/06 56/7 |
| 2006/0096136 A1 | 5/2006 | Shaffer et al. | |
| 2008/0189870 A1 * | 8/2008 | Dayton | B08B 1/04 173/217 |
| 2012/0247794 A1 * | 10/2012 | Dufty | A01G 20/43 172/521 |
| 2013/0192633 A1 | 8/2013 | Gil | |
| 2013/0212815 A1 * | 8/2013 | Kempf | E01H 1/105 15/22.1 |
| 2015/0034391 A1 * | 2/2015 | McLain | B25F 5/02 175/162 |
| 2016/0230361 A1 | 8/2016 | Prew | |
| 2018/0070785 A1 * | 3/2018 | Udy | A47L 9/0411 |

FOREIGN PATENT DOCUMENTS

| | | |
|---|---|---|
| GB | 2301012 | 11/1996 |
| KR | 101080190 | 11/2011 |
| WO | 2016042383 | 3/2016 |

OTHER PUBLICATIONS

Extended European Search Report in European Patent Application Serial No. 16/487,244, dated Dec. 8, 2020, from co-pending U.S. Appl. No. 16/487,244.

International Search Report in PCT Application No. PCT/ES2017/000145, dated Feb. 26, 2018 (English translation attached), from co-pending U.S. Appl. No. 16/487,244.

Office Action from co-pending U.S. Appl. No. 16/487,244, dated Apr. 16, 2021.

\* cited by examiner

DEVICE FOR COMBING AND CONDITIONING ARTIFICIAL TURF

RELATED APPLICATIONS

This application is the U.S. National Stage of International Patent Application No. PCT/ES2017/000144, filed Nov. 17, 2017, which is hereby incorporated by reference in its entirety, and which claims priority to Spanish Patent Application No. 0201700108, filed Feb. 23, 2017.

OBJECT OF THE INVENTION

The present invention relates to a device for combing and conditioning artificial turf, which by means of a simple system of rollers provides optimum features for combing and conditioning artificial turf.

TECHNICAL PROBLEM TO BE RESOLVED AND BACKGROUND OF THE INVENTION

There are currently many different types of artificial turf that substitute traditional turf, since the maintenance of traditional turf is complicated, expensive and requires continuous attention with respect to cutting, as well as fertilisers and nutrients that must be added for the correct growth thereof. On occasions, even when taking all of the necessary precautions and properly caring for traditional turf, invasive plant species can ruin an entire field.

Artificial turf has different qualities, according to the thread of which it is made up, and if the thread is too fine and delicate the fibres will be crushed more easily and the turf will have less resistance.

Furthermore, artificial turf becomes dirty, gets full of dust, mud, seeds, bird droppings, leaves, sand and other human elements such as paper, sunflower seeds and cigarette butts, which facilitate the formation of algae, moss or weeds, which can affect the drainage required by an artificial turf installation.

The fibre of the turf tends to lose its upright firmness over time due to the weather, especially if the use thereof is continuous, which becomes an aesthetic problem, and also constitutes a problem when demonstrating a field with artificial turf.

Furthermore, in turf subjected to an intensive use, a phenomenon known as defibrillation occurs, which happens when we have too little infill or it is unduly moved, and as such the fibre opens into more fibres due to the friction of people's shoes, leading to the breakage of fine fibres, which remain on the surface.

DESCRIPTION OF THE INVENTION

The object of the present invention is a portable device for combing and conditioning artificial turf which, by means of the device itself, allows the turf to be optimally maintained and, in addition, removes the dirt on the same that accumulates.

The device for combing and conditioning artificial turf object of the invention comprises a handle, a pole, a head and a pair of brushes driven by an electric motor housed in the head. The brushes are configured to comb and condition the artificial turf.

In the device for combing and conditioning artificial turf object of the invention, the brushes have a helical shape, and thus the rotation of the brushes in a single direction makes it so that the dirt swept by the cited brushes is removed from the turf.

The pole of the device for combing and conditioning artificial turf comprises a gripper for the left hand, and as such this gripper allows the device to be held by both hands, increasing the maneuverability of the same.

The device for combing and conditioning artificial turf object of the invention comprises a transmission connected to the motor for transmitting the movement of the motor to the brushes. The transmission comprises a motor output shaft that is associated with a transmission belt which transmits the rotation of the motor output shaft to a wheel, likewise, the wheel transmits the rotation to a transmission shaft which, in turn, ends in a worm screw, wherein the worm screw transmits the rotation to a transverse shaft via a toothed wheel attached to the cited transverse shaft, such that the transverse shaft makes the pair of brushes rotate, which are attached to the transverse shaft.

The device for combing and conditioning artificial turf object of the invention comprises a cover formed by two halves that attach to each other, covering the motor and the transmission, and thus the cover is situated on the end of the pole opposite the handle and protects the components of the device.

DESCRIPTION OF THE DRAWINGS

To complete the description, the present specification is accompanied by a set of figures constituting an integral part of the same, which represent the following.

PREFERRED EMBODIMENT OF THE INVENTION

Figure 1:
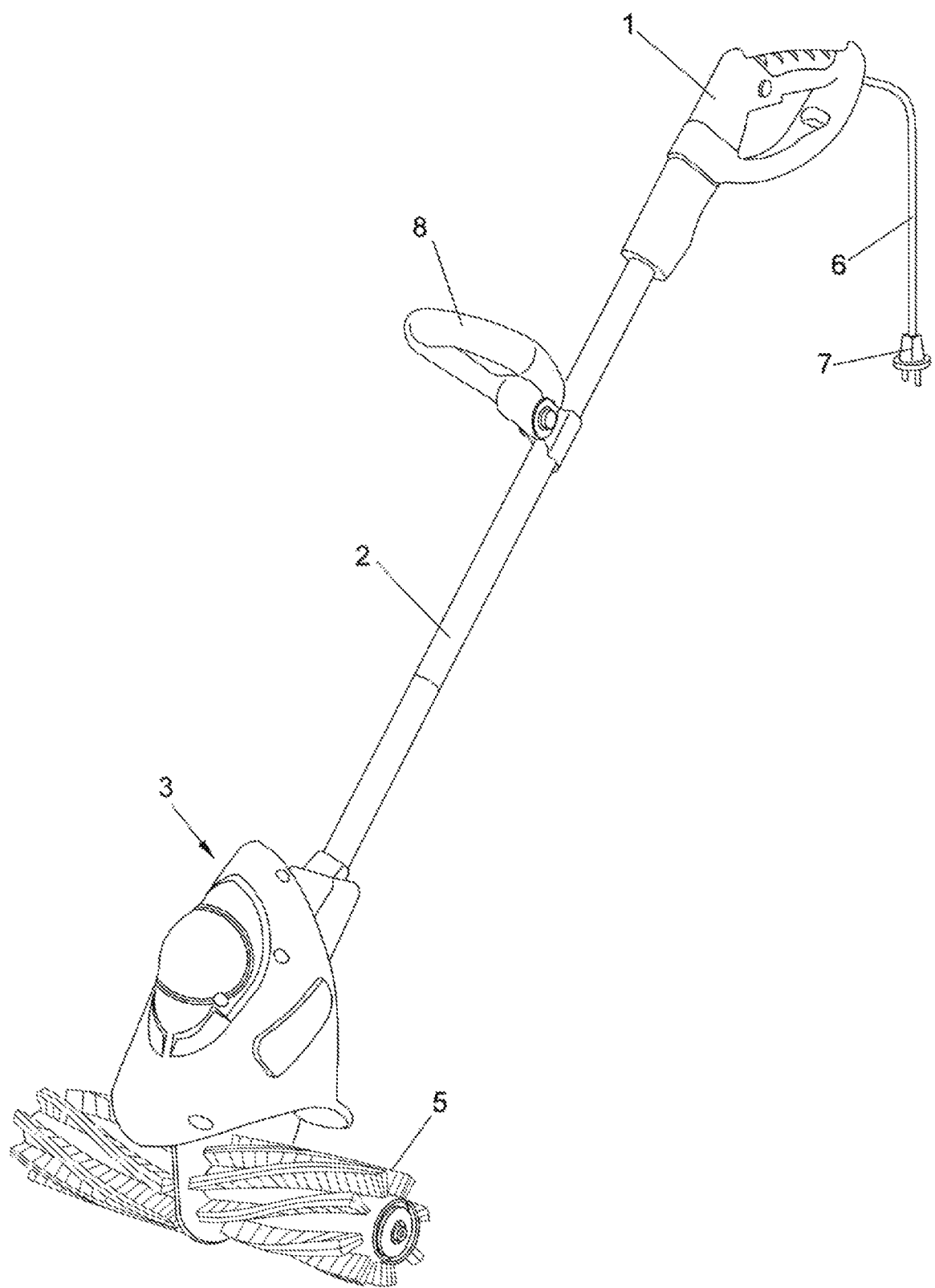
FIG. 1 shows a perspective view of the device for combing and conditioning the turf object of the invention.
Figure 2:
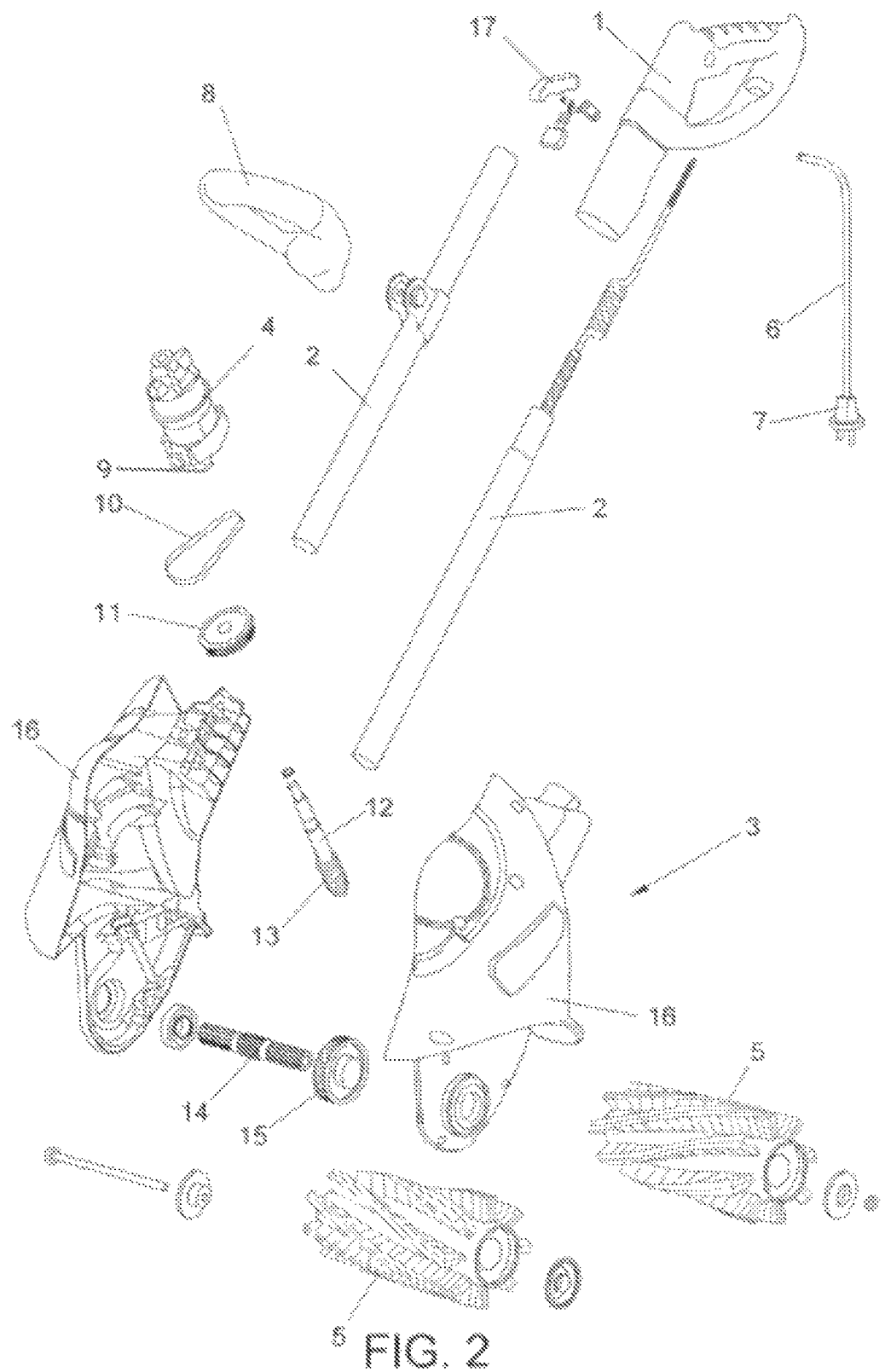
FIG. 2 shows an exploded view of all of the components of the device for combing and conditioning the turf object of the invention.

The object of the present invention, as previously indicated and as can be seen in the figures, is a device for combing and conditioning artificial turf that has a handle (1), a pole (2), a head (3) which houses an electric motor (4) and a pair of brushes (5) driven by the electric motor (4), the brushes (5) being configured for combing and conditioning the artificial turf.

The electric motor (4) receives the electrical energy by means of a cable (6), the end of which has a plug (7), which is joined to the device at the handle (1), and an electric installation that runs along the pole (2) until reaching the aforementioned electric motor (4). It is the same for the electric motor (4).

To hold the device object of the invention in a more stable way, it has a gripper (8) on the pole (2) for the left hand of the user, such that with the handle (1) and the gripper (8) the device object of the invention can be manually operated in an easier way.

The movement of the electric motor (4) is transmitted to the brushes (5) via a transmission, which carries out two gear reductions. The transmission has a motor output shaft (9) that is associated with a transmission belt (10) which transmits the rotation of a wheel (11), a first gear reduction of the rotation speed of the electric motor (4) having been produced in these elements. Before reaching the brushes (5), the wheel (11) transmits the rotation to a transmission shaft (12) that ends in a worm screw (13) which transmits the rotation to a transverse shaft (14) via a toothed wheel (15) attached to the transverse shaft (14).

Given that the transverse shaft (14) houses the brushes (5), the transmission shaft (12), via the worm screw (13), rotates the toothed wheel (15) of the transverse shaft (14) and the rotation of said transverse shaft (14) moves the brushes (5) that comb and condition the artificial turf.

With this configuration, the two brushes (5) of the device rotate in the same direction, and as such, for the device object of the invention to operate, the brushes (5) have a helical shape, and thanks to that helical shape, the rotation of the two brushes (5) in the same direction separates the debris situated on the artificial turf.

The device object of the invention comprises a cover (16) formed by two halves that are attachable to each other, covering the motor (4) and the transmission, and thus the cover (16) is situated on the end of the pole (2) opposite the handle (1).

The device object of the invention comprises a trigger (17) located on the handle (1) and configured for changing the rotation speed of the electric motor (4), the trigger (17) being a hand throttle, of the ones known in the state of the art.

INDUSTRIAL APPLICATION

The conditioning comb object of the invention can be applied in the industry of light garden machinery.

The invention claimed is:

1. A device for combing and conditioning artificial turf, characterised in that the device-comprises:
    a handle (1);
    a pole (2);
    a head (3) which houses an electric motor (4);
    a pair of brushes (5) driven by the electric motor (4), the brushes (5) being configured for combing and conditioning the artificial turf, wherein the brushes (5) are configured to rotate in a single direction and have a helical shape; and
    a transmission which, in turn, comprises a motor output shaft (9) that is associated with a transmission belt (10) which transmits the rotation to a toothed wheel (11), the wheel (11) transmits the rotation to a transmission shaft (12) which ends in a worm screw (13) that transmits rotation to a transverse shaft (14) via a toothed wheel (15) attached to the transverse shaft (14) that houses the pair of brushes (5).

2. The device for combing and conditioning artificial turf according to claim 1, characterised in that the device comprises a cover (16) formed by two halves that are attachable to each other, covering the motor (4) and the transmission, and thus the cover (16) is situated on the end of the pole (2) opposite the handle (1).

3. The device for combing and conditioning artificial turf according to claim 2, wherein the cover (16) does not cover the brushes (5).

* * * * *